United States Patent

Goodhart et al.

[19]

[11] 3,879,511

[45] Apr. 22, 1975

[54] TASTELESS METHENAMINE MANDELATE IN A STABILIZED VEGETABLE OIL SUSPENSION

[75] Inventors: Frank W. Goodhart, Morristown; James R. Draper, Dover, both of N.J.

[73] Assignee: Warner-Lambert Company, Morris Plains, N.J.

[22] Filed: Aug. 27, 1973

[21] Appl. No.: 391,106

Related U.S. Application Data

[62] Division of Ser. No. 268,371, July 3, 1972, Pat. No. 3,780,170.

[52] U.S. Cl. .................. 424/35; 424/38; 424/78; 424/249; 424/362; 424/365
[51] Int. Cl. .................. A01n 17/00; A61k 9/00
[58] Field of Search ......... 424/35, 38, 78, 249, 362, 424/365

[56] References Cited
UNITED STATES PATENTS

| | | | |
|---|---|---|---|
| 2,902,407 | 9/1959 | Gross et al. | 424/38 |
| 2,921,883 | 1/1960 | Reese et al. | 424/35 |
| 3,035,985 | 5/1962 | Stoyle et al. | 424/38 |
| 3,037,911 | 6/1962 | Stoyle et al. | 424/38 |
| 3,077,438 | 2/1963 | Fano et al. | 424/249 |
| 3,080,292 | 3/1963 | Koff | 424/38 |
| 3,080,293 | 3/1963 | Koff | 424/38 |
| 3,247,065 | 4/1966 | Koff | 424/35 |
| 3,492,397 | 1/1970 | Peters et al. | 424/38 X |
| 3,629,394 | 12/1971 | Gaunt et al. | 424/38 |
| 3,780,170 | 12/1973 | Goodhart et al. | 424/35 |

FOREIGN PATENTS OR APPLICATIONS

| | | | |
|---|---|---|---|
| 1,462,193 | 11/1966 | France | 424/35 |
| 1,106,454 | 5/1961 | Germany | |

*Primary Examiner*—Shep K. Rose
*Attorney, Agent, or Firm*—Albert H. Graddis; Frank S. Chow; Anne M. Kelly

[57] ABSTRACT

A substantially tasteless methenamine mandelate suspension contains particles of methenamine mandelate enveloped in a coating of ethyl cellulose and at least one secondary coating ingredient including hydrogenated castor oil, paraffin, and/or a polyethylene glycol polymer or mixture of polyethylene glycol polymers. The coating is applied from a solvent solution, using conventional spray drying techniques. The coated methenamine mandelate particles are suspended in a vegetable oil vehicle to which a suspension stabilizer may be added. This suspension is stable, palatable and therapeutically active, upon oral administration, for the treatment of urinary infections. The addition of artificial sweeteners to mask the normally unpleasant taste of methenamine mandelate is not required. Flavor, coloring and relatively small amounts of sugar may be added to the suspension to provide specific taste qualities, if desired.

5 Claims, No Drawings

TASTELESS METHENAMINE MANDELATE IN A STABILIZED VEGETABLE OIL SUSPENSION

CROSS REFERENCE TO RELATED APPLICATION

This application is a division of application U.S. Ser. No. 268,371, filed July 3, 1972, now U.S. Pat. No. 3,780,170.

BACKGROUND OF THE INVENTION

Methenamine mandelate suspensions which can be administered orally in the treatment of urinary infections are known. A particularly effective product of this type is disclosed in U.S. Pat. No. 3,077,438, assigned to Warner-Lambert Pharmaceutical Company, wherein a suspension of methenamine mandelate in sesame oil is stabilized with the triglyceride of 12-hydroxy stearic acid. Flavor and relatively large amounts of sweetener must be added to this formulation in order to mask the extremely unpleasant taste of the methenamine mandelate suspension. Since large amounts of sweetener are required, sugar, which would increase the bulk of the final product to a disproportionate degree without substantially increasing sweetness, cannot be used. Therefore, substantial quantities of artificial sweetners must be added to provide a product of sufficient palatability for oral administration. Without these quantities of artificial sweetener, the taste of the methenamine mandelate suspension of U.S. Pat. N0. 3,077,438 would be so distasteful as to preclude oral administration of this drug, especially to children. Liquid dosage forms are generally preferred in pediatric medicine and the palatability of a methenamine mandelate suspension is a deciding factor in the choice of this product for administration to children.

Recently, there have been a number of reports concerning the deleterious effects of the continued use of certain artificial sweetening agents. The need for a palatable methenamine mandelate suspension, without the use of objectionable artificial sweetening agents, has thus become increasingly evident. As stated above, sugar alone cannot be used in methenamine mandelate suspensions because such large quantities are necessary to mask the unpleasant taste of the product. Alternate sugar substitutes, having a higher sweetening capacity than sugar may, in time, present the same problem as is being encountered with the artificial sweeteners now in use. Therefore, it would seem that a totally new approach to taste masking is needed in order to provide a palatable methenamine mandelate suspension suitable for oral administration.

SUMMARY OF THE INVENTION

Methenamine mandelate particles are coated with ethyl cellulose and at least one secondary coating ingredient selected from the group hydrogenated castor oil, paraffin, and a polyethylene glycol polymer or a mixture of polyethylene glycol polymers having an average molecular weight of from 200 to 20,000. The coating is applied by spray drying a solution of the coating ingredients in a suitable solvent, such as methylene chloride, to which finely powdered methenamine mandelate has been added. The resulting coated particles are then suspended in a vegetable oil vehicle, optionally containing a suspension stabilizer, to provide a substantially tasteless formulation suitable for oral administration.

DESCRIPTION OF THE INVENTION

It has now been found that a palatable methenamine mandelate suspension can be formulated without the use of artificial sweetening agents. Moreover, the methenamine mandelate formulation provided by this invention is surprisingly palatable and, more importantly, therapeutically active when administered orally.

According to the precepts of this invention, the particles of methenamine mandelate (fine powder, preferably 60 mesh or smaller) are enveloped in a spray-dried coating, prior to incorporation into a suitable suspending vehicle. Specifically, a two-component, insoluble film is formed around the individual methenamine mandelate particles so as to mask the taste of the methenamine mandelate when formulated in a vegetable oil suspending vehicle. The coating remains intact and is not dissolved by the oil suspension, even after prolonged periods of storage. Upon oral administration, the film does break down in the gastro-intestinal tract to release the methenamine mandelate particles within the body system.

The film enveloping fine, powdered methenamine mandelate is a spray-dried coating of ethyl cellulose and at least one other coating ingredient selected from the group: hydrogenated castor oil, paraffin and/or a polyethyleneglycol polymer or a mixture of such polymers. To form the film, the coating ingredients are dissolved in a suitable solvent, the powdered methenamine mandelate is added and the mixture is spray-dried and congealed using conventional spray-drying equipment. Suitable spray drying equipment and techniques are described in Marshall, W. R., Jr., "Atomization and Spray Drying," Chem. Eng. Prog. Monograph Series, No. 2, Vol. 50, Am. Institute of Chemical Engineers, 1954; and in Belcher, D. W. et al., "Design And Use of Spray Dryers," Chem. Eng. p. 1–16, Sept. 30 and 14, 1963. Coated methenamine mandelate particles are obtained, having a very slight sour taste when dried, but being substantially tasteless when formulated into an oil suspension for oral administration.

The ethyl cellulose ingredient in the spray dried coating is a non-toxic, pharmaceutically acceptable ethyl ether of cellulose, containing between 43 to 51%, preferably 46.5%, of ethoxy groups, calculated on a dried basis. The solubility of the ethyl cellulose is dependent upon the degree of substitution, e.g., the number of ethoxy groups. The ethyl cellulose suitable for use in the practice of this invention may be described as being of a grade which will produce a viscosity of from 6 to 350 centipoises, preferably 10 to 20 centipoises, when dissolved at a 5% concentration in a mixture of 80 parts toluene and 20 parts alcohol.

The hydrogenated castor oil suitable for inclusion in the spray-dried coating of this invention is non-toxic, pharmaceutically acceptable hard, white wax derivated from castor oil, having a molecular weight of about 932 and a melting point of between 86° and 88°C.

The paraffin ingredient which may be used in the spray-dried coating of this invention is a non-toxic, pharmaceutically acceptable mixture of solid hydrocarbons having the general formula $C_nH_{2n+2}$, obtained from petroleum.

The polyethylene glycol polymer ingredient in the spray-dried coating is a non-toxic, pharmaceutically acceptable polymer of ethylene oxide, having the generalized formula $HOCH_2(CH_2OCH_2)n\text{-}CH_2OH$ wherein the "n" represents the average number of oxyethylene groups. A polyethylene glycol polymer of the type described, or a mixture such polymers having an average molecular weight of from 200 to 20,000, preferably 950 to 7,500, and most preferably 6,000 to 7,500 may be incorporated in the spray-dried coating of this invention.

In forming the mixture of coating ingredients and methenamine mandelate prior to spray-drying, any solvent or combination of solvents may be used which will dissolve the coating ingredients. It is not necessary that the methenamine mandelate itself be soluble in the solvent system selected. Suitable solvents which may be used include semi-polar solvents such as alkyl alcohols, including methanol, ethanol, isopropanol, butanol, and the like; ethylene dichloride; ethyl or butylacetate; methylene chloride, and the like. Mixtures of semi-polar and polar solvents may also be employed, i.e., the above mentioned solvents mixed with such substances as benzene, toluene, xylene, carbon tetrachloride, and the like. From a practical point of view, considering cost, toxicity and flammability, methylene chloride is the preferred solvent for use in the practice of this invention.

The coated methenamine mandelate particles of this invention having substantially tasteless qualities, are prepared to contain the following concentrations of ingredients:

|  | Broad Range* | Preferred Range* |
| --- | --- | --- |
| powered methenamine mandelate (fine) | 20% to 80% | 44% to 65% |
| ethyl cellulose | 5% to 35% | 10% to 23% |
| hydrogenated castor oil, paraffin, and/or polyethylene glycol polymer(s) | 15% to 45% | 15% to 35% |

*Percentages are calculated as percent by weight, based on the total weight of the coated methenamine mandelate particles.

Typical coated methenamine mandelate particles which may be incorporated into a vegetable oil vehicle to provide a substantially tasteless methenamine mandelate suspension, suitable for oral administration, may be formulated to contain the following proportions of ingredients:

Formula No. 1

|  | Broad Range* | Preferred Amount |
| --- | --- | --- |
| Powdered Methenamine Mandelate (fine) | 70% to 20% | 44.5% |
| Ethylcellulose | 10% to 35% | 22.2% |
| Polyethylene Glycol Polymer | 20% to 45% | 33.3% |

Formula No. 2

|  | Broad Range* | Preferred Amount |
| --- | --- | --- |
| Powdered Methenamine Mandelate (fine) | 80% to 25% | 55% |
| Ethylcellulose | 5% to 30% | 10% |
| Hydrogenated Castor Oil | 15% to 45% | 35% |

Formula No. 3

|  | Broad Range* | Preferred Amount |
| --- | --- | --- |
| Powdered Methenamine Mandelate (fine) | 50% to 75% | 65% |
| Ethylcellulose | 10% to 20% | 20% |
| Paraffin | 15% to 30% | 15% |

*Percentages are calculated as percent by weight, based on the total weight of the coated methenamine mandelate particles.

A particularly preferred formula contains 44.5% of methenamine mandelate as a fine powder, which will pass through a 60 mesh screen, 22.2% of ethyl cellulose having an ethoxy content of 46.5% by weight and a viscosity grade of from 10 to 20 centipoises and 33.3% of a polyethylene glycol polymer having an average molecular weight of 6,000 to 7,500.

The above formulations may be incorporated into a suitable vegetable oil vehicle according to the procedures disclosed in aforementioned U.S. Pat. No. 3,077,438. As examples of oily vehicles there may be mentioned such non-toxic pharmaceutically acceptable oils as sesame oil, olive oil, peanut oil, corn oil, specially refined coconut oil and cottonseed oil. A particularly preferred oil, because of taste quality, is the specially refined coconut oil.

In many formulations, it is advantageous to include a suspension stabilizer to insure that the therapeutic quantities of methenamine mandelate will not settle out of the suspension, but will remain uniformly distributed throughout the oily vehicle. As an example of such a suspension stabilizer, there may be mentioned the triglyceride of 12-hydroxy stearic acid. This last mentioned stabilizer is particularly preferred because of its palatability, but other similar stabilizers may be used. The suspension stabilizer is generally added in amounts ranging from 0 to 2.5% by weight, based on the total weight of the suspension, the amount being used depending upon the concentrations of solids within the oily suspension. Preferably, between 0.1 to 2.5%, and most preferably, 0.75% by weight of suspension stabilizer is used.

Substantially tasteless oily suspensions may be formulated to contain a relatively wide range of the coated methenamine mandelate particles of this invention. For example, when the coated methenamine mandelate particles contain from 20 to 80% by weight of powdered methenamine mandelate, corresponding suspensions should be formulated to contain from 6.25 to 51% of coated methenamine mandelate; from 49 to 91.25% of vegetable oil; and from 0 to 2.5% of suspension stabilizer. When the coated methenamine mandelate particles contain from 44 to 65% by weight of powdered methenamine mandelate, corresponding vegetable oil suspensions should be formulated to contain from 7.69 to 22.73% of coated methenamine mandelate; from 74.77 to 89,91% of vegetable oil; and from 0.1 to 2.5% of suspension stabilizer. In the particularly preferred product of this invention, a coated methenamine mandelate containing 44.5% of powdered methenamine mandelate is formulated into an oily suspension containing 22.47% of coated methenamine mandelate particles, 76.78% of specially refined coconut oil and 0.75% of the triglyceride of 12-hydroxy stearic acid as the suspension stabilizer, which provides a unit dosage containing approximately 10% active ingredient. For dosage at levels of 5% active ingredient, a suspension formulated with coated methenamine mandelate particles containing 44.5% powdered methenamine mandelate should contain 11.24% coated methenamine mandelate particles, 88.01% specially refined coconut oil; and 0.75% of the trigyleride of 12-hydroxy stearic acid as the suspension stabilizer.

The above suspensions of coated methenamine mandelate are substantially tasteless and do not require additional artificial sweetening agents to mask the normally unpleasant taste of untreated methenamine mandelate. These suspensions may be administered orally as such, but in order to achieve specific taste sensations and improved palatability, certain flavors and, optionally, small amounts of powdered sugar, may be added to the formulations. In addition, coloring agents and preservatives normally used in pharmaceutical formulations may also be included, without departing from the intrinsic inventive concepts of this invention.

Significantly, the coating enveloping the finely powdered methenamine mandelate is unaffected by the oily vehicle of the suspension, thus providing a storage-stable, marketable product. Upon oral administration, the normally unpleasant taste of methenamine mandelate is completely masked. However, once in the gastrointestinal tract, the coating is broken down by body fluids and therapeutic quantities of methenamine mandelate are released into the body system.

In order to further illustrate this invention the following examples are provided:

EXAMPLE 1

Preparation Of Coated Methenamine Mandelate 222 grams of ethyl cellulose containing 46.5% ethoxy groups and having a viscosity grade of 10 to 20 centipoises and 333 grams of polyethylene glycol (average molecular weight 6,000 to 7,500) are mixed together, added to approximately 2,500 ml of methylene chloride and dispersed, using an Eppenbach Homo-mixer. 445 grams of methenamine mandelate U.S.P. are passed through a Fitzpatrick comminuting machine employing a 60 mesh screen and added slowly to the solution of ethyl cellulose and polyethylene glycol, with mixing. A final volume of methylene chloride is added to make 4,000 ml and is thoroughly mixed. The entire mixture is spray-dried in a NERCO-NIRO Portable Spray-Dryer with the inlet temperature set at 100°C and the atomizer set at 3.4 Kg/Cm$^2$. The feed rate is about 75 ml per minute. A fine white powder which is almost tasteless is obtained.

EXAMPLE 2

Preparation Of Coated Methenamine Mandelate

The procedure of Example 1 is followed using as the ingredients, 100 grams of ethyl cellulose, 350 grams of hydrogenated castor oil, 550 grams of screened methenamine mandelate powder and a sufficient quantity of methylene chloride to make a volume of 5,000 ml.

EXAMPLE 3

Preparation Of Coated Methenamine Mandelate

The procedure of Example 1 is followed using as ingredients 200 grams of ethyl cellulose, 150 grams of paraffin (melting point 58°C), 650 grams of screened methenamine mandelate powder and a sufficient quantity of methylene chloride to make a volume of 5,000 ml.

EXAMPLE 4

Preparation Of Coated Methenamine Mandelate

The procedure of Example 1 is followed using as the ingredients 200 grams of ethylcellulose, 250 grams polyethylene glycol having an average molecular weight between 6,000 – 7,500, 100 grams of hydrogenated castor oil (CASTOR WAX, sold Baker Castor Oil in Bayonne, N.J.)450 grams of screened methenamine mandelate and a sufficient quantity of methylene chloride to make a volume of 5,000 ml.

EXAMPLE 5

Tasteless Methenamine Mandelate Suspension

Dissolve 1 gram of Propylparaben U.S.P. in 600 ml. of specialy refined coconut oil (Vegetable Oil 1400, NEOBEE M5 sold by Drew Chemical Co., Boonton, N.J.) by heating to 55°C. Maintain the temperature of this solution at 50°C to 60°C while adding 10 grams of the triglyceride of 12-hydroxystearic acid (THIXCIN, sold by Baker Castor Oil Co., Bayonne, N.J.), and mix with an Eppenbach Homo-mixer or equivalent for 30 minutes. Allow to cool. Add 111 grams of coated methenamine mandelate, prepared as described in Example 1 above, with mixing. Add a sufficient amount of specially refined coconut oil to bring the volume of the suspension to 1,000 ml. Mix thoroughly. This formulation provides, in each 5 ml. dosage unit, 0.25 grams of methenamine mandelate.

EXAMPLE 6

Tasteless Methenamine Mandelate Suspension

Dissolve 1 gram of Propylparaben U.S.P. in 600 ml. of specially refined coconut oil (Vegetable Oil 1400, NEOBEE M5, sold by Drew Chemical Co., Boonton, N.J.) by heating to 55°C. Maintain the temperature of this solution at 50°C to 60°C while adding 8 grams to the triglyceride of 12-hydroxystearic acid (THIXCIN, sold by Baker Castor Oil Co., Bayonne, N.J.), and mix with an Eppenbach homo-mixer or equivalent for 30 minutes. Allow to cool. Slowly add 222 grams of coated methenamine mandelate (prepared as described in Example 1 above), with mixing. Add a sufficient amount of specially refined coconut oil to bring the volume of the suspension to 1,000 ml. Mix thoroughly. This formulation will provide in one 5 ml. dosage unit, 0.50 grams of methenamine mandelate.

EXAMPLE 7

Flavored Methenamine Mandelate Suspension

Dissolve 1 gram of Propylparaben U.S.P. in 600 ml. of specially refined coconut oil (Vegetable Oil 1400, NEOBEE M5, sold by Drew Chemical Co., Boonton, N.J.), by heating to 55°C. Maintain the temperature of this solution at 50°C to 60°C while adding 7.5 grams of the triglyceride of 12-hydroxystearic acid (THIXCIN, sold by Baker Castor Oil Co., Bayonne, N.J.), and mix with an Eppenbach Homo-mixer or equivalent for 30 minutes. Allow to cool and add 100 grams of powdered sugar, and 1.86 ml. of flavor oils. Mix until uniform. Add 111 grams of coated methenamine mandelate, prepared as described in Example 1 above, with mixing. Add a sufficient amount of specially refined coconut oil to bring the volume of the suspension to 1,000 ml. Mix thoroughly. This formulation is flavored and provides, in each 5 ml. dosage unit, 0.25 grams of methenamine mandelate.

EXAMPLE 8

Flavored Methenamine Mandelate Suspension

Dissolve 1 gram of Propylparaben U.S.P. in 600 ml. of specially refined coconut oil (Vegetable Oil 1400, NEOBEE M5, sold by Drew Chemical Co., Boonton, N.J.), by heating to 55°C. Maintain the temperature of this solution at 50°C to 60°C while adding 7.5 grams to the triglyceride of 12-hydroxystearic acid (THIXCIN, sold by Baker Castor Oil Co., Bayonne, N.J.), and mix with an Eppenbach Homo-mixer or equivalent for 30 minutes. Allow to cool and add 100 grams of powdered sugar, 1.2 grams of solid synthetic flavor and coloring agent, and 20 ml. of flavor oils. Mix until uniform. slowly add 222 grams of coated methenamine mandelate (prepared as described in Example 1 above), with mixing. Add a sufficient amount of specially refined coconut oil to bring the volume of the suspension to 1,000 ml. Mix thoroughly. This formulation is flavored and colored, and will provide in one 5 ml. dosage unit, 0.50 grams of methenamine mandelate.

We claim:

1. A substantially tasteless suspension of coated methenamine mandelate particles consisting essentially of:
   A. from about 49% to about 91.25% by weight, based on the total weight of the suspension, of vegetable oil vehicle;
   B. from about 0 to about 2.5% by weight of a suspension stabilizer; and
   C. from about 6.25% to about 51% by weight of coated methenamine mandelate particles comprising;
      1. from about 20 to about 80% by weight of finely powdered methenamine mandelate, based on the total weight of the coated particles;
      2. from about 5 to about 35% by weight of ethyl cellulose; and
      3. from about 15 to about 45% by weight of at least one coating ingredient selected from a group consisting of polyethylene glycol polymers having an average molecular weight of from about 200 to about 20,000.

2. A substantially tasteless suspension according to claim 1 consisting essentially of:
   A. from about 74.77 to about 89.81% by weight, based on the total weight of the suspension, of vegetable oil vehicle;
   B. from about 0.1 to about 2.5% by weight of a suspension stabilizer; and
   C. from about 7.69 to about 22.73% by weight of coated methenamine mandelate particles comprising:
      1. from about 44 to about 65% by weight of finely powdered methenamine mandelate, based on the total weight of the coated particles;
      2. from about 10 to about 23% by weight of ethyl cellulose; and
      3. from about 15 to about 35% by weight of at least one coating ingredient selected from a group consisting of polyethylene glycol polymers having an average molecular weight of from about 200 to about 20,000.

3. A substantially tasteless suspension according to claim 2 wherein the ethyl cellulose ingredient has an ethoxy content of from about 43 to about 51%, and a viscosity grade of from about 6 to about 350 centipoises.

4. A substantially tasteless suspension according to claim 3 wherein the polyethylene glycol polymers have an average molecular weight of from about 950 to 7500.

5. A substantially tasteless suspension according to claim 4 consisting essentially of:
   A. from about 76.78 to about 88.01% by weight, based on the total weight of the suspension, of vegetable oil vehilce;
   B. about 0.75% by weight of a suspension stabilizer; and
   C. from about 11.24 to about 22.47% by weight of coated methenamine mandelate particles comprising:
      1. about 44.5% of finely powdered methenamine mandelate;
      2. about 22.2% ethyl cellulose, having a viscosity grade of from about 10 to about 20 centipoises; and
      3. about 33.3% of a polyethylene glycol polymer ingredient having an average molecular weight of from about 6,000 to about 7,500.

* * * * *